(12) United States Patent
Gibbons et al.

(10) Patent No.: US 8,584,104 B2
(45) Date of Patent: Nov. 12, 2013

(54) COMPILE-TIME MANAGEMENT OF POLYPHASIC MODULES

(75) Inventors: Jonathan J. Gibbons, Mountain View, CA (US); Alexander R. Buckley, Cupertino, CA (US); Mark B. Reinhold, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 691 days.

(21) Appl. No.: 12/823,918

(22) Filed: Jun. 25, 2010

(65) Prior Publication Data

US 2011/0321019 A1     Dec. 29, 2011

(51) Int. Cl.
*G06F 9/45* (2006.01)
(52) U.S. Cl.
USPC .......................... 717/140; 717/141; 717/148
(58) Field of Classification Search
USPC ................................................ 717/141, 148
See application file for complete search history.

(56) References Cited

U.S. PATENT DOCUMENTS 4,104,718 A * 8/1978 Poublan et al. ...................... 1/1
8,230,406 B2 * 7/2012 Carbone et al. ............... 717/145

OTHER PUBLICATIONS

Blume et al., "Hierarchical Modularity", Jul. 1999.*
Martin Elsman, "A Framework for Cut-Off Incremental Recompilation and Inter-Module Optimization", 2008.*

* cited by examiner

*Primary Examiner* — Phillip H Nguyen
(74) *Attorney, Agent, or Firm* — Park, Vaughan, Fleming & Dowler LLP; Chia-Hsin Suen

(57) ABSTRACT

The disclosed embodiments provide a system that facilitates the compilation of a software program. During operation, the system uses a directory hierarchy for the software program to infer a compilation unit to be used in the software program as a member of a module. Next, the system obtains a module declaration for the module using the directory hierarchy. Finally, the system enables compilation of the software program by dynamically identifying and locating one or more dependencies of the module using the module declaration and the directory hierarchy.

17 Claims, 7 Drawing Sheets

COMPILE-TIME MANAGEMENT OF POLYPHASIC MODULES

RELATED APPLICATIONS

The subject matter of this application is related to the subject matter in a co-pending non-provisional application by inventors Mark B. Reinhold, Alexander R. Buckley, Jonathan J. Gibbons and Karen M. P. Kinnear, filed on 30 Apr. 2010, entitled "Polyphasic Modules for Software Development," having Ser. No. 12/771,121.

The subject matter of this application is related to the subject matter in a co-pending non-provisional application by inventors Alexander R. Buckley, Mark B. Reinhold, and Karen M. P. Kinnear and filed on 30 Apr. 2010, entitled "Access Control in Modules for Software Development," having Ser. No. 12/771,654.

BACKGROUND

1. Field

The present embodiments relate to module-based systems for software development. More specifically, the present embodiments relate to techniques for compile-time management of polyphasic modules.

2. Related Art

Within software systems, increasing sophistication and functionality are typically accompanied by corresponding increases in code size and complexity. For example, the addition of new features to a software program may require the implementation of new components, which in turn may increase the number of dependencies within the software program. Over time, changes to the software program may lead to increases in defects, debugging time, redundancy, and lack of readability. The continued development of a software system without effective complexity management may consequently reduce performance and increase maintenance risk to the point of rendering the software system unusable and/or unmanageable.

Issues associated with increasing software complexity may be mitigated by modularizing software systems. Modular software utilizes components that are self-contained and that facilitate a separation of concerns. For example, individual modules may be developed, tested, and used independently of one another in a software system. In addition, a module's functionality and dependencies may be explicitly declared through an interface provided by the module. Modularized software may thus be significantly more maintainable, easier to understand, and less complex than monolithic software.

Hence, increased use of modularity may improve the design, maintenance, performance, scalability, and growth of software systems.

SUMMARY

The disclosed embodiments provide a system that facilitates the compilation of a software program. During operation, the system uses a directory hierarchy for the software program to infer a compilation unit to be used in the software program as a member of a module. Next, the system obtains a module declaration for the module using the directory hierarchy. Finally, the system enables compilation of the software program by dynamically identifying and locating one or more dependencies of the module using the module declaration and the directory hierarchy.

In some embodiments, using the directory hierarchy to infer the compilation unit as the member of the module involves obtaining a path in the directory hierarchy for the compilation unit, and removing package information from the path to locate a module directory corresponding to the module.

In some embodiments, the module declaration is obtained from a module definition file in the module directory.

In some embodiments, dynamically identifying and locating the one or more dependencies of the module involves:
(i) obtaining a module path for the software program;
(ii) obtaining the dependencies from the module declaration;
(iii) listing available modules associated with the module path;
(iv) generating a set of module directory paths based on the available modules and the dependencies; and
(v) merging the module directory paths into a classpath.

In some embodiments, generating the set of module directory paths based on the available modules and the dependencies involves selecting a subset of the available modules to be used in compilation of the software program based on the dependencies.

In some embodiments, merging the module directory paths into the classpath involves ordering the module directory paths based on the dependencies.

In some embodiments, the classpath limits the visibility of each of the selected subset of the available modules based on the dependencies.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
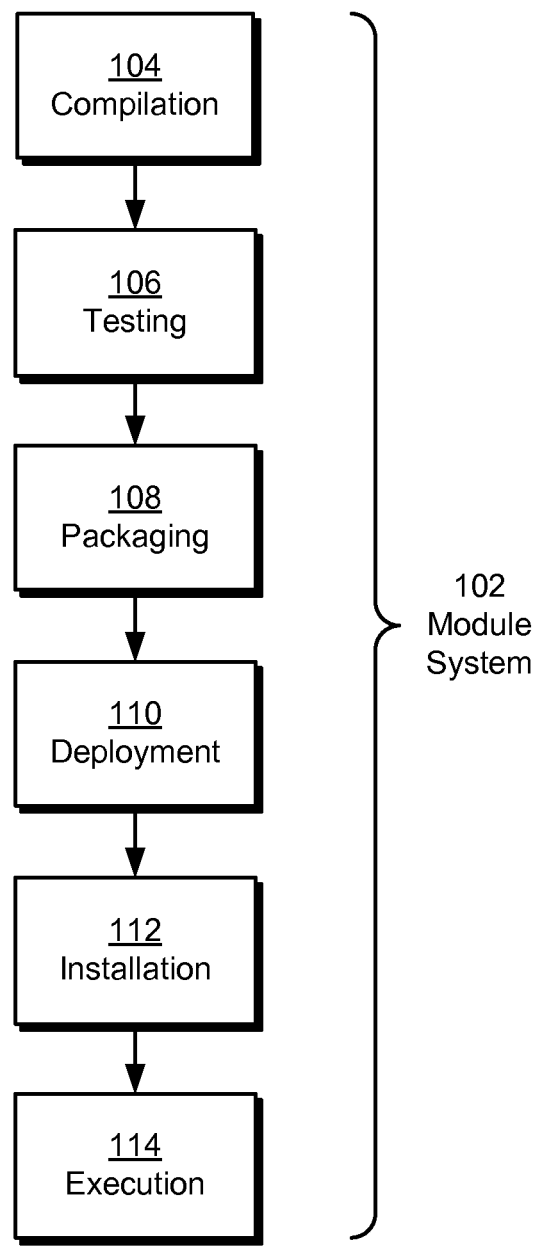
FIG. 1 shows the life cycle of a software program in accordance with an embodiment.

FIG. 1 shows the life cycle of a software program in accordance with an embodiment. The life cycle begins with a compilation 104 phase, in which source code for the software program is converted into an executable format. Next, the compiled software program undergoes a testing 106 phase to detect failures, defects, and/or other issues in the implementation of the software program. For example, testing 106 may be carried out to analyze the correctness, security, scalability, performance, maintainability, and/or usability of the software program.

After testing 106, packaging 108 of the software program may involve creating a software package in an archive format from the software program's executable code. The software package may then undergo deployment 110 and installation 112 on a computer system. For example, a web application may be deployed and installed on a server computer, while a native application may be deployed and installed on multiple personal computers. Finally, execution 114 of the software program allows the software program's intended functionality to be provided to an end user.

Those skilled in the art will appreciate that changes such as patches, upgrades, maintenance, and/or new releases may be periodically made to the software program. Moreover, such changes may be propagated through some or all of the phases of the life cycle. For example, the addition of new features to the software program may require that the software program be recompiled, tested, packaged, deployed, installed, and executed with the new features.

Those skilled in the art will also appreciate that changes to the software program may increase the complexity of the software program, which may eventually interfere with the maintainability, usability, and/or performance of the software program. For example, modifications to the software program may be difficult to document and/or track across all phases 104-114 of the software program's life cycle. Over time, such modifications may interfere with the continued use and development of the software program by obscuring the design of the software program, increasing redundancy, and introducing new, unknown dependencies among components in the software program.

To mitigate issues associated with increased software complexity, a module system 102 may be used to facilitate the development of the software program. In one or more embodiments, module system 102 uses modular information at all phases 104-114 of the life cycle to manage dependencies in the software program. Such polyphasic modularization may facilitate the development of the software program by improving transparency, cohesion, performance, scalability, and maintainability in the software program. Management of polyphasic modules is discussed in a co-pending non-provisional application by inventors Mark Reinhold, Alexander Buckley, Jonathan Gibbons and Karen Kinnear and filed on the same day as the instant application entitled "Polyphasic Modules for Software Development," having Ser. No. 12/771,121, and filing date Apr. 30, 2010, which is incorporated herein by reference.

Moreover, such polyphasic modularization may be used to provide access control during all phases 104-114 of the software program's life cycle. Access control in polyphasic modules is discussed in a co-pending non-provisional application by inventors Alexander Buckley, Mark Reinhold, and Karen Kinnear and filed on the same day as the instant application entitled "Access Control in Modules for Software Development," having Ser. No. 12/771,654, and filing date Apr. 30, 2010, which is incorporated herein by reference.

Figure 2:
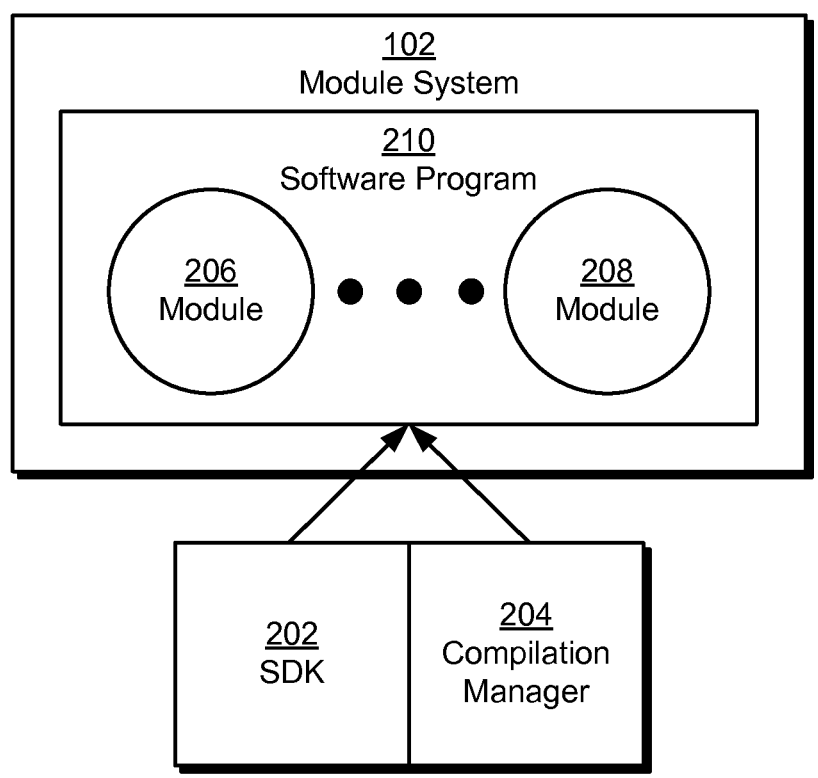
FIG. 2 shows the development and compilation of a software program using a module system in accordance with an embodiment.

FIG. 2 shows the development and compilation of a software program 210 using module system 102 in accordance with an embodiment. As shown in FIG. 2, module system 102 includes a software development kit (SDK) 202 and a compilation manager 204. SDK 202 and compilation manager 204 may interact with module system 102 to manage software program 210 across the development and compilation stages of the life cycle of software program 210. For example, SDK 202 and/or compilation manager 204 may form a part of the Java (Java™ is a registered trademark of Oracle America, Inc.) Development Kit (JDK).

As mentioned above, module system 102 may use modules 206-208 to facilitate the development of software program 210. In one or more embodiments, modules 206-208 correspond to standalone components in software program 210 that may be independently programmed, tested, and modified. Each module 206-208 may be defined, organized, and used through a corresponding module identity and module declaration. In addition, an interface to a module may be based on the members of the module. For example, the module may be accessed through public methods and/or data in the module's members. Logical boundaries between modules 206-208 may further be enforced by enabling inter-module interaction only through the interfaces to the modules, thus effectively hiding implementation details of modules 206-208 from one another.

In other words, modules 206-208 may correspond to encapsulated abstractions of functionality in software program 210 with well-defined capabilities and dependencies. Modules 206-208 may thus provide a large amount of flexibility in organizing the structure of software program 210. For example, Java classes may be grouped into modules 206-208 based on the functionality and/or use of the classes in software program 210 instead of language-based constraints such as package membership. As discussed below, such flexibility may facilitate the automated and/or efficient compilation of software program 210.

In one or more embodiments, module declarations for modules 206-208 are obtained separately from source code for software program 210. For example, module declarations for modules 206-208 in a Java program may be stored in module definition files that are separate from source files containing Java classes, interfaces, enumerations, and/or annotation types. Such decoupling of module declarations from module implementations may further enable the creation of modules 206-208 based on factors that facilitate the design and development of software program 210, such as separation of concerns, scalability, and performance.

The independent creation and procurement of module declarations may additionally allow module system 102 to begin modularizing software program 210 before software program 210 is compiled. For example, module system 102 may allow module declarations for modules 206-208 to be created (e.g., using SDK 202) before development of source code for software program 210 is complete. Module system 102 may proceed with using the module declarations to manage dependencies in software program 210 through the compilation, testing, packaging, deployment, installation, and execution phases of the life cycle of software program 210.

More specifically, modules 206-208 may be used by SDK 202 and/or compilation manager 204 to facilitate the compilation of software program 210. First, SDK 202 may enable the creation of a directory hierarchy that allows compilation units in software program 210 to be inferred rather than explicitly stated as members of modules 206-208. Next, SDK 202 and/or compilation manager 204 may dynamically identify and locate dependencies of the modules using module declarations for modules 206-208 and the directory hierarchy. As discussed below, such dynamic identification and location of modules and dependencies may automate and/or simplify the compilation of software program 210 while enforcing visibility and/or accessibility restrictions between modules 206-208.

Figure 3:
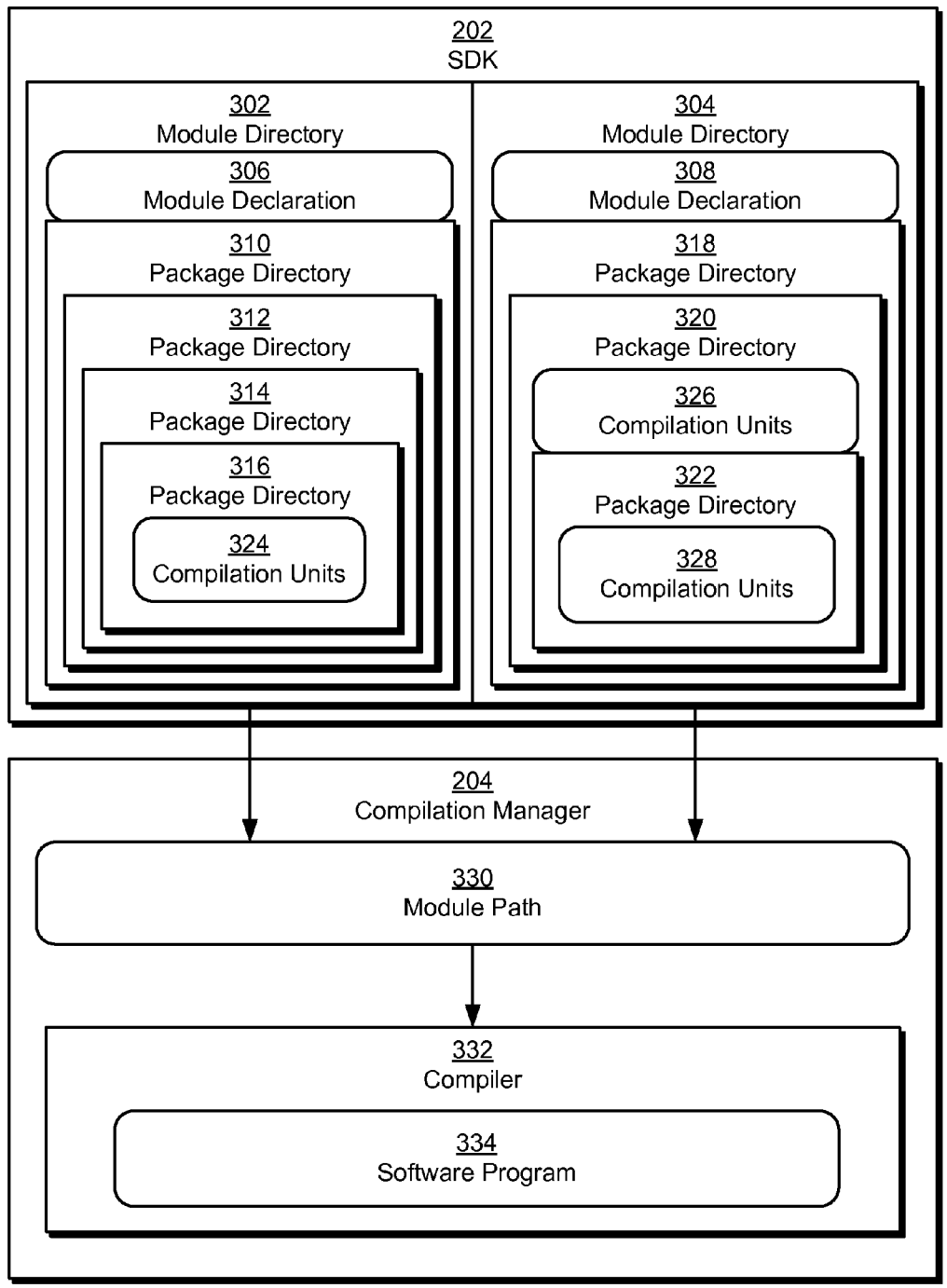
FIG. 3 shows an exemplary use of modules by a software development kit (SDK) and a compilation manager in accordance with an embodiment.

FIG. 3 shows an exemplary use of modules by SDK 202 and compilation manager 204 in accordance with an embodiment. As mentioned previously, SDK 202 may enable the creation of one or more sets of compilation units 324-328 as members of modules using a directory hierarchy for a software program 334. For example, SDK 202 may organize packages and modules used by a Java program into a hierarchy of directories and/or sub-directories representing the packages and modules.

As shown in FIG. 3, the directory hierarchy includes two module directories 302-304, with each module directory corresponding to a different module in the software program. For example, module directory 302 may correspond to a module that provides a user interface in software program 334, while module directory 304 may correspond to a module that provides data persistence for software program 334. In addition, each module directory 302-304 contains a module declaration 306-308 for the corresponding module. As discussed in the above-referenced applications, module declarations 306-308 may uniquely identify the modules associated with module directories 302-304 (e.g., using a name and version) and describe dependencies, local dependencies, and/or reverse dependency constraints between the modules. For example, a module declaration for a module in a Java program may be stored in a module definition file corresponding to a module compilation unit (e.g., "module-info.java") and/or a manifest file (e.g., "MANIFEST.MF") and may list one or more other modules as dependencies of the module.

Module directories 302-304 may also contain one or more package directories 310-322 corresponding to packages in software program 334. Moreover, each package directory may contain compilation units 324-328 and/or other package directories representing sub-packages in software program 334. As a result, module directories 302-304 may allow packages in different locations to be grouped within the same module. For example, package directories traditionally identified by multiple classpath entries for a Java program may be placed under a module directory to group the corresponding packages within a module represented by the module directory.

Within module directory 302, compilation units 324 are stored in package directory 316, which is a sub-directory of package directory 314. Package directory 314 is a sub-directory of package directory 312, which in turn is a sub-directory of package directory 310. Finally, package directory 310 is a sub-directory of module directory 302. In other words, the module represented by module directory 302 may contain four levels of packages and sub-packages, with compilation units 324 in the sub-package corresponding to the lowest level. For example, a fully qualified name of Java type named "MyType" in module directory 302 may correspond to "com.foo.bar.xyz.MyType," with package names of "com," "foo," "bar," and "xyz" for packages 310, 312, 314, and 316, respectively.

Within module directory 304, compilation units 328 are stored in package directory 322, which is a sub-directory of package directory 320. Package directory 320 also contains compilation units 326 and is a sub-directory of package directory 318, while package directory 318 is a sub-directory of module directory 304. As a result, the module represented by module directory 304 may contain three levels of packages and sub-packages, with compilation units 326-328 in sub-packages corresponding to the two lowest levels. For example, package directories 318, 320, and 322 may be named "game," "world," and "level," respectively; a type named "Boss" in package directory 322 may thus have a fully qualified name of "game.world.level.Boss," while a type named "Ocean" in package directory 320 may have a fully qualified name of "game.world.Ocean."

In addition, module directories 302-304 may be placed between a special library directory (not shown) and parts of the directory hierarchy representing fully qualified package names. For example, a path of "homes/abc/src/modules/M/com/foo/bar/xyz/MyType.java" in the directory hierarchy may indicate that the "MyType" compilation unit is a member of the "com.foo.bar.xyz" package and the "M" module, and that the "homes/abc/src/modules" directory is a library directory that contains the "M" module. Multiple modules may thus be consolidated into one or more library directories in the directory hierarchy. For example, all modules used by software program 334 may be placed under one library directory in the directory hierarchy, while modules used by a different software program may be placed under another library directory in the directory hierarchy.

As mentioned previously, the directory hierarchy may facilitate the automated, efficient, and/or simplified compilation of software program 334. In particular, compilation manager 204 may user the directory hierarchy to infer compilation units 324-328 as members of the respective modules. To analyze the directory hierarchy, compilation manager 204 may obtain a path for a compilation unit from compilation units 324-328 and remove package information from the path to locate a module directory (e.g., module directories 302-304) corresponding to the module of which the compilation unit is a member. Compilation manager 204 may also obtain a module declaration (e.g., module declarations 306-308) for the module using the directory hierarchy.

For example, the module associated with a path of "homes/abc/src/modules/M/com/foo/bar/xyz/MyType.java" in a Java directory hierarchy may be identified by computing the fully qualified name of the package of which the "MyType" type is a member (e.g., "com.foo.bar.xyz," obtained from a package declaration in the MyType.java compilation unit) and removing components from the path until the path no longer contains package components. The resulting path may thus correspond to "homes/abc/src/modules/M," or the module directory for the "M" module. In addition, the module declaration for the "M" module may be obtained from a module definition file (e.g., "module-info.java," "MANIFEST.MF," etc.) in the module directory.

Compilation manager 204 may then enable compilation of software program 334 by dynamically identifying and locating dependencies of the module using the module declaration and the directory hierarchy. First, compilation manager 204 may obtain a module path 330 for software program 334. In one or more embodiments, entries in module path 330 correspond to library directories for modules (e.g., corresponding to directories that contain module directories 302-304) in the directory hierarchy. For example, an entry in module path 330 for the exemplary "MyType" type above may correspond to "homes/abc/src/modules," while another entry in module path 330 may be "homes/john/src/modules." In other words, module path 330 may specify locations of module libraries associated with software program 334.

Next, compilation manager 204 may obtain the dependencies from the module declaration for the module. As described above, the module declaration may be obtained using the directory hierarchy and may include one or more other modules as dependencies. Moreover, an executable form of software program 334 may be created by compiling the module along with all dependencies associated with the module. For example, an "M" module may depend on an "A" module and a "B" module; in turn, the "A" module may depend on a "C" module and a "D" module, while the "B" module may depend on an "E" module and an "F" module. As a result, the compilation of a software program that includes the "M" module may also require the compilation of the "A," "B," "C," "D," "E," and "F" modules.

Compilation manager 204 may also list available modules associated with module path 330. In one or more embodiments, compilation manager 204 lists the available modules as paths to module directories in module path 330. For example, module path 330 may contain two entries of "homes/user/src/modules" and "homes/system/src/modules." In addition, the library directory corresponding to the first entry may include module directories for two modules named "User1" and "User2", and the library directory corresponding to the second entry may include a module directory for a module named "System1." The available modules for module path 330 may thus be listed as "homes/user/src/modules/User1," "homes/user/src/modules/User2," and "homes/system/src/modules/System1." Alternatively, the list of available modules may omit path information and simply contain the module names of "User1," "User2," and "System1."

The available modules and the dependencies may then be used to generate a set of module directory paths for software program 334. Using the example above, if the "User1" module depends on the "System1" module, the module directory paths may include both "homes/user/src/modules/User1" and "homes/system/src/modules/System1." In other words, compilation manager 204 may select a subset of the available modules for compilation of software program 334 based on dependencies of the modules to be used in software program 334.

In one or more embodiments, modules are selected for use in compilation of software program 334 by resolving dependencies and satisfying reverse dependency constraints associated with the available modules. Selection of modules for compilation and/or use in software programs is discussed in a co-pending non-provisional application by inventors Mark Reinhold, Alexander Buckley, and Jonathan Gibbons and filed on the same day as the instant application, entitled "Dependency Resolution in Polyphasic Modules," having Ser. No. 12/914,499, and filing date Oct. 28, 2010, which is incorporated herein by reference.

Finally, the module directory paths are merged into a classpath for use by a compiler 332 in locating compilation units and/or classes during compilation of software program 334. In one or more embodiments, the module directory paths are merged into the classpath in a manner that maintains visibility and accessibility restrictions among the modules. First, the module directory paths may be ordered within the classpath based on dependencies and/or reverse dependency constraints, as described in the above-referenced application. Next, the classpath may limit the visibility of each of the selected subset of available modules based on the dependencies.

More specifically, the classpath may maintain separation between the dependencies of two different modules so that definitions in one module's dependencies do not interfere with definitions in the other module's dependencies. For example, an "M1" module may depend on the "M2," "M4," and "M6" modules, while the "M2" module may depend on the "Mx," My," and Mz" modules. Instead of building a linear classpath containing all seven modules, compilation manager 204 may annotate and/or otherwise construct a classpath in which only the "M2," "M4," and "M6" modules are visible to the "M1" module and only the "Mx," My," and Mz" modules are visible to the "M2" module. Such annotation may involve the use of references, marker bits, data structures, and/or other mechanisms for enforcing visibility and accessibility during compilation of software program 334.

The use of modules and module path 330 by SDK 202 and compilation manager 204 may thus simplify and/or automate the compilation of software program 334. In particular, the grouping of directories representing packages into modules and the subsequent grouping of modules into library directories representing module path entries may allow module path 330 to reduce complexity and manual user input associated with traditional classpath-based compilation mechanisms. For example, module path 330 may contain three entries: a path to a user module library, a path to a system module library, and a path to a group module library. Furthermore, default locations for the module libraries (e.g., within the directory hierarchy) may enable compilation of software program 334 without requiring a user to manually specify module path 330. Conversely, the reduced number of entries in module path 330 may allow user modifications to module path 330 to be easily made and may mitigate versioning and/or runtime issues associated with classpath-based compilation of software programs.

In other words, the compilation of software program 334 may require only the entry point to software program 334. For example, a user may compile a Java program by providing a compilation unit containing a main method to a Java compiler (e.g., "javac MyProgram.java"). The Java compiler may then use the compilation unit, the module declaration for a module containing the compilation unit, a default module path for the Java program, and the directory hierarchy of the Java program to dynamically identify and locate other modules and/or compilation units used in the Java program. Finally, the Java compiler may compile the Java program from the modules and/or compilation units without requiring additional input from the user.

Figure 4:
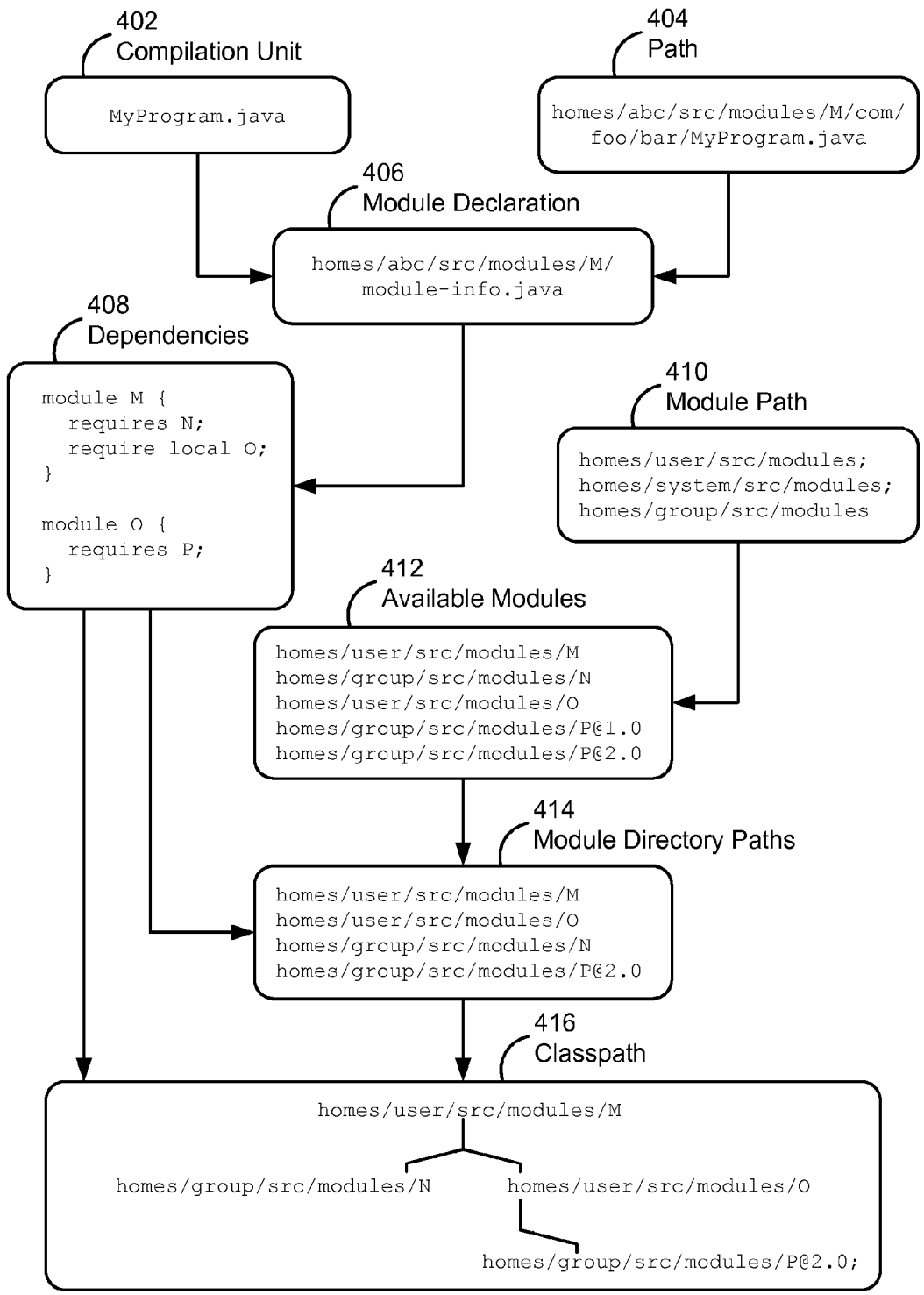
FIG. 4 shows the exemplary generation of a classpath for a software program in accordance with an embodiment.

FIG. 4 shows the exemplary generation of a classpath 416 for a software program in accordance with an embodiment. For example, FIG. 4 may show the generation of classpath 416 for use in compiling a Java software program. As discussed above, classpath 416 may be dynamically generated by a compilation manager (e.g., compilation manager 204 of FIG. 2) instead of provided by a user. To generate classpath 416, the compilation manager may obtain a compilation unit 402 (e.g., "MyProgram.java") to be used in the software program, such as a compilation unit containing an entry point into the software program.

Next, a directory hierarchy may be used to infer compilation unit 402 as a member of a module. To analyze the membership of compilation unit 402 in the module, a path 404 (e.g., "homes/abc/src/modules/M/com/foo/bar/MyProgram.java") in the directory hierarchy may be obtained for compilation unit 402, and package information may be removed from the path to locate a module directory corresponding to the module. For example, the last four components may be removed from path 404 to obtain "homes/abc/src/modules/M" as the location of the module directory. Moreover, the name of the module directory (e.g., "M") may identify the module of which compilation unit 402 is a member. In other words, compilation unit 402 may be inferred as a member of the module by identifying the module directory for the module in path 404.

The module directory may also allow a module declaration 406 for the "M" module to be obtained from a module definition file (e.g., "homes/abc/src/modules/M/module-info.java") in the module directory. Module declaration 406 may include one or more dependencies 408 of the "M" module. In particular, the "M" module may include a local dependency on the "N" module and a local dependency on the "O" module. Dependencies of the "M" module on the "N" and "O" modules may further be used to find module declarations for and, in turn, dependencies of the "N" and "O" modules. In particular, a module declaration for the "O" module may include a dependence on the "P" module. Thus, dependencies 408 may include all modules (e.g., "N," "O," and "P") that the "M" module depends on, both directly and indirectly.

Classpath 416 may then be dynamically constructed using dependencies 408 and a module path 410 for the software program. Module path 410 may include a set of locations (e.g., library directories) for module directories associated with the software program. For example, module path 410 may include a path to a user module library (e.g., "homes/user/src/modules"), a path to a system module library (e.g., "homes/system/src/modules"), and a path to a group module library (e.g., "homes/group/src/modules"). Module path 410 may be set by a user or automatically built from default values associated with the development and/or compilation environment of the software program. In other words, module path 410 may significantly reduce and/or eliminate manual user input in locating compilation units during compilation of the software program.

First, a set of available modules 412 may be listed using module path 410. In particular, available modules 412 may correspond to the set of modules found in the library directories of module path 410. As shown in FIG. 4, five available modules may be found in module path 410; the "homes/user/src/modules" path contains the "M" and "O" modules, while the "homes/group/src/modules" path contains the "N" module and two different versions of the "P" module (e.g., "P@1.0" and "P@2.0").

A set of module directory paths 414 may then be generated from available modules 412 and dependencies 408. Module directory paths 414 may correspond to entries in a classpath used to compile the software program. As a result, module directory paths 414 may be selected as a subset of available modules 412 to be used in compilation of the software program. Furthermore, the selected modules may represent an optimal solution to constraints associated with dependencies 408 and/or reverse dependency constraints among available modules 412.

Finally, module directory paths 414 are merged into classpath 416. In addition, module directory paths 414 may be ordered, structured, and/or annotated within classpath 416 to limit the visibility and/or accessibility of the selected modules to one another. For example, classpath 416 may correspond to a data structure (e.g., tree) that maintains visibility and/or accessibility restrictions among modules in the software program. Within classpath 416, the root node of the data structure corresponds to the "M" module (e.g., "homes/user/src/modules/M") because the "M" module may contain an entry point into the software program. The children of the root node may correspond to the "N" (e.g., "homes/group/src/modules/N") and "O" (e.g., "homes/user/src/modules/O") modules to represent the dependencies of the "M" module. Finally, the "P@2.0" module appears as a child (e.g., "homes/group/src/modules/P@2.0") of the "O" node to represent the dependence of the "O" module on "P."

Because classpath 416 maintains dependency relationships among the modules, visibility and/or accessibility restrictions may be maintained during compilation of the software program using classpath 416. For example, the nodes of classpath 416 may be traversed in a specific order to ensure that the "P@2.0" module is invisible to the "M" and "N" modules.

Figure 5:
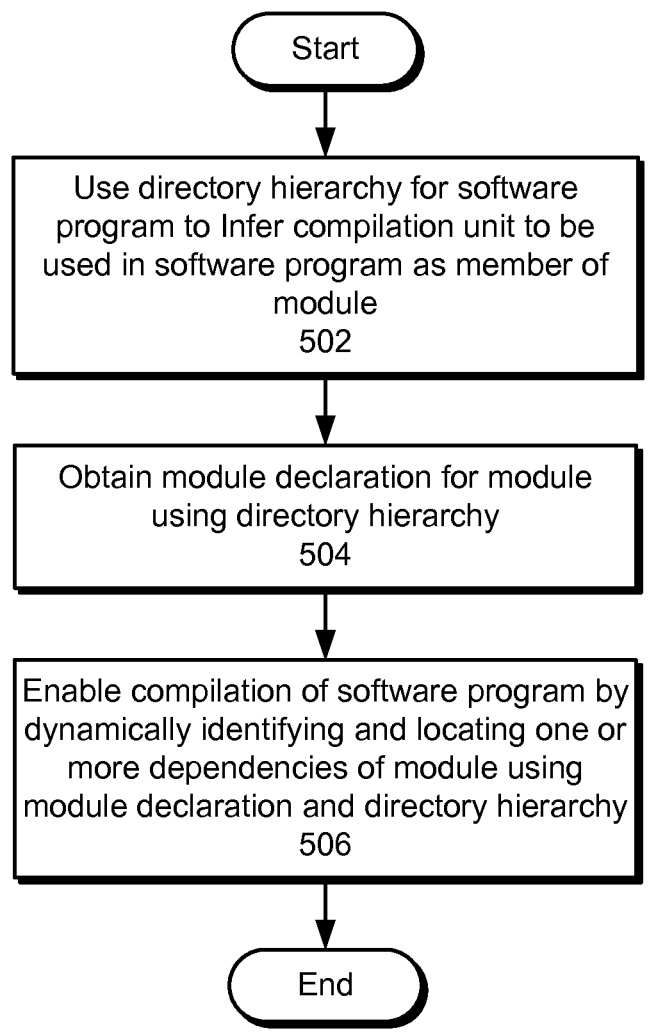
FIG. 5 shows a flowchart illustrating the process of facilitating the compilation of a software program in accordance with an embodiment.

FIG. 5 shows a flowchart illustrating the process of facilitating the compilation of a software program in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

Initially, a directory hierarchy is used to infer a compilation unit to be used in the software program as a member of a module (operation 502). The compilation unit may contain source code for a class in the software program. For example, the compilation unit may correspond to a Java class. In addition, the compilation unit may be associated with a directory hierarchy that includes one or more package directories and one or more module directories. As a result, the module of which the compilation unit is a member may be inferred by obtaining a path in the directory hierarchy for the compilation unit and removing package information from the path to locate a module directory corresponding to the module.

A module declaration for the module may also be obtained using the directory hierarchy (operation 504). For example, a module declaration for a module in a Java program may be obtained from a module definition file (e.g., module compilation unit, manifest file, etc.) in the module directory corresponding to the module. The module declaration may include one or more dependencies, local dependencies, and/or reverse dependency constraints associated with the module.

Compilation of the software program may then be enabled by dynamically identifying and locating one or more dependencies of the module using the module declaration and directory hierarchy (operation 506). Dynamic identification and location of the module's dependencies is discussed in further detail below with respect to FIG. 6.

Figure 6:
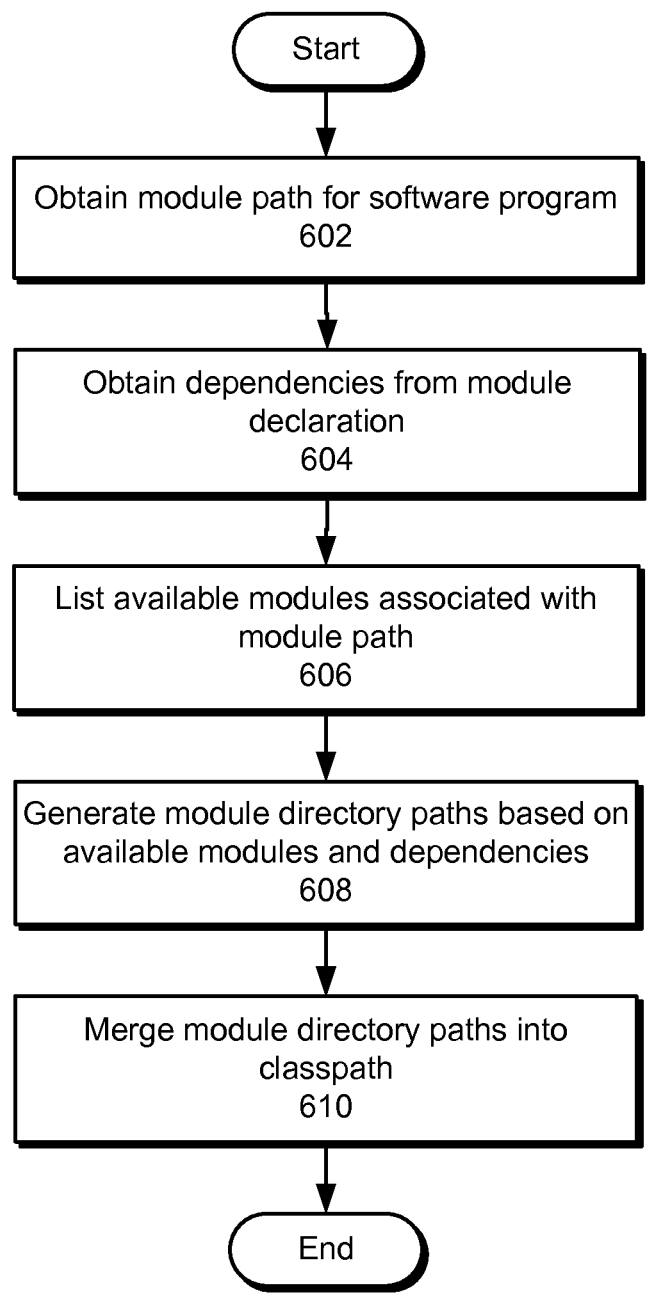
FIG. 6 shows a flowchart illustrating the process of dynamically identifying and locating dependencies of a module in accordance with an embodiment.

FIG. 6 shows a flowchart illustrating the process of dynamically identifying and locating dependencies of a module in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, a module path for a software program is obtained (operation 602). The module path may contain one or more locations of modules associated with the software program. For example, the module path may include paths to module libraries associated with the software program. In addition, the module path may be user-specified and/or automatically generated from default values associated with a development and/or compilation environment for the software program. Because entries in the module path may correspond to library directories containing groups of modules, and each module may be used to group packages, the module path may be significantly shorter and/or easier to manage than a traditional classpath of package directories.

Next, one or more dependencies are obtained from the module declaration (operation 604) and/or module declarations associated with the software program. The dependencies may include other modules on which the module directly or indirectly depends, as well as reverse dependency constraints that limit the visibilities of the modules to one another. Available modules associated with the module path are then listed (operation 606). The available modules may be listed as paths to module directories corresponding to the available modules and/or as a set of module names of the available modules.

A set of module directory paths is generated based on the available modules and the dependencies (operation 608). The module directory paths may correspond to a subset of the available modules to be used in compilation of the software program. In addition, the subset of the available modules may be selected based on the dependencies, reverse dependency constraints, and/or versions of the available modules.

Finally, the module directory paths are merged into a classpath (operation 610). As mentioned above, the classpath may include a data structure, order, and/or annotations that maintain accessibility and/or visibility restrictions among the modules during compilation. As a result, the classpath may both mitigate complexity, version control, and runtime issues associated with conventional classpaths and facilitate access control enforcement across the life cycle of the software program.

Figure 7:
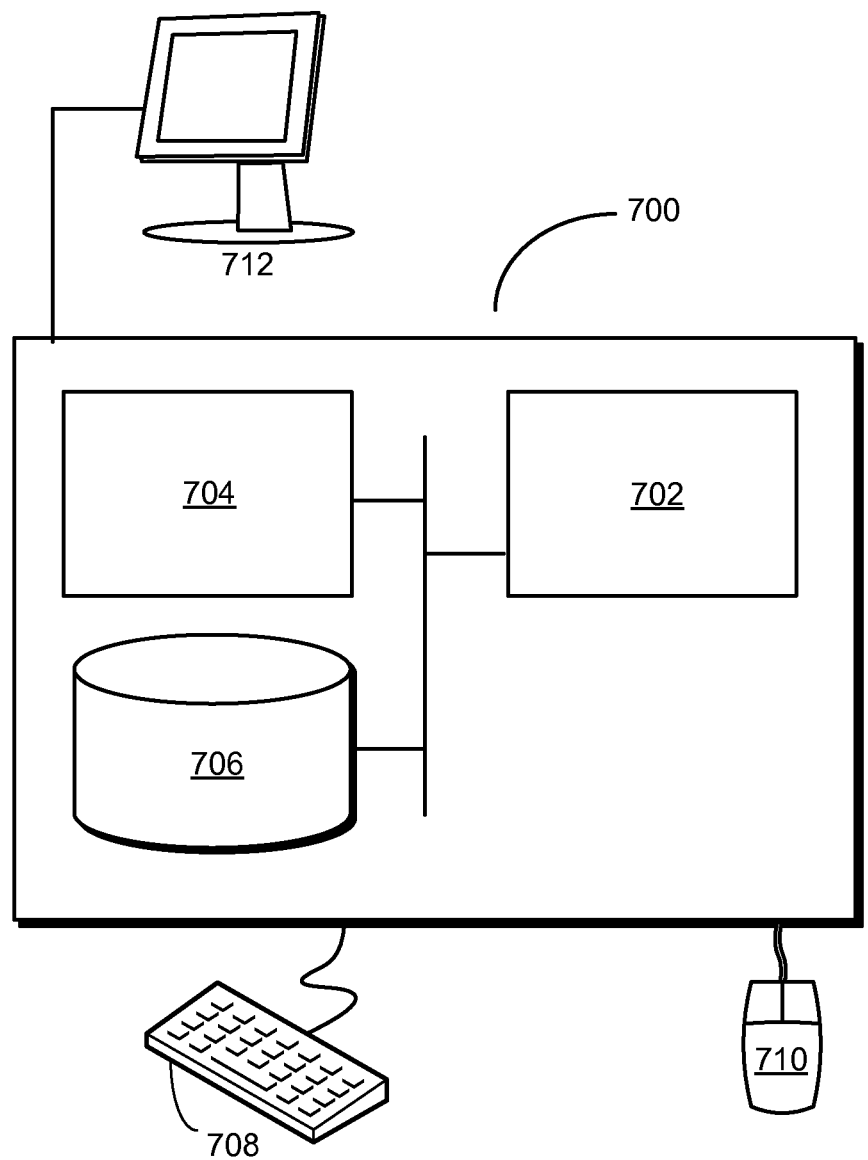
FIG. 7 shows a computer system in accordance with an embodiment.

FIG. 7 shows a computer system 700 in accordance with an embodiment. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating the compilation of a software program. The system may include an SDK and a compilation manager. The SDK may enable the creation of a module associated with the software program using a directory hierarchy for the software program. The compilation manager may then use the directory hierarchy to infer a compilation unit to be used in the software program as a member of the module, and obtain a module declaration for the module using the directory hierarchy. Finally, the compilation manager may enable compilation of the software program by dynamically identifying and locating one or more dependencies of the module using the module declaration and the directory hierarchy.

In addition, one or more components of computer system 700 may be remotely located and connected to the other components over a network. Portions of the present embodiments (e.g., SDK, compilation manager, etc.) may also be located on different nodes of a distributed system that implements the embodiments. For example, the present embodiments may be implemented using a cloud computing system that provides a module system for managing the life cycles and/or compilation of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the compilation of a software program, comprising:
   using a directory hierarchy for the software program to infer a compilation unit to be used in the software program as a member of a module, which involves:
      obtaining a path in the directory hierarchy for the compilation unit, wherein the path includes package information and a module directory corresponding to the module; and
      removing the package information from the path to locate the module directory corresponding to the module;
   obtaining a module declaration for the module using the directory hierarchy; and
   enabling compilation of the software program by dynamically identifying and locating one or more dependencies of the module using the module declaration and the directory hierarchy.

2. The computer-implemented method of claim 1, wherein the module declaration is obtained from a module definition file in the module directory.

3. The computer-implemented method of claim 1, wherein dynamically identifying and locating the one or more dependencies of the module involves:
   obtaining a module path for the software program;
   obtaining the dependencies from the module declaration;
   listing available modules associated with the module path;
   generating a set of module directory paths based on the available modules and the dependencies; and
   merging the module directory paths into a classpath.

4. The computer-implemented method of claim 3, wherein generating the set of module directory paths based on the available modules and the dependencies involves:
   selecting a subset of the available modules to be used in compilation of the software program based on the dependencies.

5. The computer-implemented method of claim 4, wherein merging the module directory paths into the classpath involves:
   ordering the module directory paths based on the dependencies.

6. The computer-implemented method of claim 4, wherein the classpath limits the visibility of each of the selected subset of the available modules based on the dependencies.

7. A system for facilitating the compilation of a software program, comprising:
- a processor;
- a memory;
- a software development kit (SDK) configured to enable the creation of a module associated with the software program using a directory hierarchy for the software program; and
- a compilation manager configured to:
  - use the directory hierarchy to infer a compilation unit to be used in the software program as a member of a module, which involves:
    - obtaining a path in the directory hierarchy for the compilation unit, wherein the path includes package information and a module directory corresponding to the module; and
    - removing the package information from the path to locate a module directory corresponding to the module;
  - obtain a module declaration for the module using the directory hierarchy; and
  - enable compilation of the software program by dynamically identifying and locating one or more dependencies of the module using the module declaration and the directory hierarchy.

8. The system of claim 7, wherein the module declaration is obtained from a module definition file in the module directory.

9. The system of claim 7, wherein dynamically identifying and locating the one or more dependencies of the module involves:
- obtaining a module path for the software program;
- obtaining the dependencies from the module declaration;
- listing available modules associated with the module path;
- generating a set of module directory paths based on the available modules and the dependencies; and
- merging the module directory paths into a classpath.

10. The system of claim 9, wherein generating the set of module directory paths based on the available modules and the compilation units involves:
- selecting a subset of the available modules to be used in compilation of the software program based on a set of dependencies associated with the compilation units.

11. The system of claim 10, wherein merging the module directory paths into the classpath involves:
- ordering the module directory paths based on the dependencies.

12. The system of claim 10, wherein the classpath limits the visibility of each of the selected subset of the available modules based on the dependencies.

13. A non-transitory computer-readable storage medium storing instructions that when executed by a computer cause the computer to perform a method for facilitating the compilation of a software program, the method comprising:
- using a directory hierarchy for the software program to infer a compilation unit to be used in the software program as a member of a module, which involves:
  - obtaining a path in the directory hierarchy for the compilation unit, wherein the path includes package information and a module directory corresponding to the module; and
  - removing the package information from the path to locate a module directory corresponding to the module;
- obtaining a module declaration for the module using the directory hierarchy; and
- enabling compilation of the software program by dynamically identifying and locating one or more dependencies of the module using the module declaration and the directory hierarchy.

14. The non-transitory computer-readable storage medium of claim 13, wherein the module declaration is obtained from a module definition file in the module directory.

15. The non-transitory computer-readable storage medium of claim 13, wherein dynamically identifying and locating the one or more dependencies of the module involves:
- obtaining a module path for the software program;
- obtaining the dependencies from the module declaration;
- listing available modules associated with the module path;
- generating a set of module directory paths based on the available modules and the dependencies; and
- merging the module directory paths into a classpath.

16. The non-transitory computer-readable storage medium of claim 15, wherein generating the set of module directory paths based on the available modules and the dependencies involves:
- selecting a subset of the available modules to be used in compilation of the software program based on the dependencies.

17. The non-transitory computer-readable storage medium of claim 16, wherein the classpath limits the visibility of each of the selected subset of the available modules based on the dependencies.

* * * * *